United States Patent
Ahn et al.

(10) Patent No.: US 11,568,816 B1
(45) Date of Patent: Jan. 31, 2023

(54) BURN-IN COMPENSATION SCHEME FOR LIGHT-EMITTING DIODE BASED DISPLAYS

(71) Applicant: Meta Platforms Technologies, LLC, Menlo Park, CA (US)

(72) Inventors: Jeong-Keun Ahn, Palo Alto, CA (US); Min Hyuk Choi, San Jose, CA (US); Zhiming Zhuang, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/592,081

(22) Filed: Feb. 3, 2022

(51) Int. Cl.
*G09G 3/3258* (2016.01)
*G02B 27/01* (2006.01)
*G09G 5/10* (2006.01)
*G09G 3/3233* (2016.01)

(52) U.S. Cl.
CPC ....... *G09G 3/3258* (2013.01); *G02B 27/0172* (2013.01); *G09G 5/10* (2013.01); *G09G 3/3233* (2013.01); *G09G 2300/0819* (2013.01); *G09G 2320/0233* (2013.01); *G09G 2320/041* (2013.01); *G09G 2320/043* (2013.01); *G09G 2320/046* (2013.01)

(58) Field of Classification Search
CPC ...... G09G 3/3258; G09G 3/3233; G09G 5/10; G09G 2300/0819; G09G 2320/041; G09G 2320/043; G09G 2320/046; G09G 2320/0233; G02B 27/0172
USPC .......................................................... 345/204
See application file for complete search history.

(56) References Cited

U.S. PATENT DOCUMENTS

| 7,619,593 | B2 * | 11/2009 | Fish | G09G 3/3233 345/82 |
| 9,552,765 | B2 * | 1/2017 | Lee | G09G 3/3233 |
| 10,872,566 | B2 * | 12/2020 | Qu | G09G 3/3291 |
| 2015/0356915 | A1 * | 12/2015 | Seo | G09G 3/3233 345/690 |
| 2016/0086534 | A1 * | 3/2016 | Seo | G09G 3/3233 345/690 |
| 2016/0189604 | A1 * | 6/2016 | Hu | G09G 3/3225 345/215 |
| 2017/0263184 | A1 * | 9/2017 | Chen | G09G 3/3266 |
| 2018/0130419 | A1 * | 5/2018 | He | G09G 3/3258 |
| 2019/0025965 | A1 * | 1/2019 | Yang | G09G 3/32 |
| 2019/0073946 | A1 * | 3/2019 | Su | H01L 27/3262 |
| 2020/0402463 | A1 * | 12/2020 | Wang | G09G 3/3233 |

(Continued)

*Primary Examiner* — Tom V Sheng
(74) *Attorney, Agent, or Firm* — Fenwick & West LLP

(57) ABSTRACT

Embodiments of the present disclosure relate to a pixel circuit with a burn-in compensation. The pixel circuit includes a light-emitting diode (LED), a first driving transistor between a voltage source and the LED, a switching transistor coupled to a gate electrode of the first driving transistor, and a second driving transistor connected between the voltage source and the LED. The first driving transistor provides first current from the voltage source to the LED according to a gate voltage of the first driving transistor. The switching transistor is turned on after receiving an enable signal. The second driving transistor provides second current from the voltage source to the LED according to a version of the gate voltage of the first driving transistor received at a gate of the second driving transistor via the switching transistor.

20 Claims, 10 Drawing Sheets

Pixel Circuit
310

(56) References Cited

U.S. PATENT DOCUMENTS

2021/0325987 A1* 10/2021 Yang .................... H01L 27/323
2022/0051633 A1*  2/2022 Li ....................... G09G 3/3266

* cited by examiner

700

```
┌─────────────────────────────────────────────────────────────────────┐
│ Provide, via a first driving transistor of a pixel circuit between  │
│ a voltage source and a light-emitting diode (LED), first current    │
│ $i_T$ from the voltage source to the LED according to a gate       │
│ voltage of the first driving transistor                             │
│                              705                                    │
└─────────────────────────────────────────────────────────────────────┘
                                  ↓
┌─────────────────────────────────────────────────────────────────────┐
│ Turn on a switching transistor of the pixel circuit coupled to a    │
│ gate electrode of the first driving transistor after receiving an   │
│ enable signal                                                       │
│                              710                                    │
└─────────────────────────────────────────────────────────────────────┘
                                  ↓
┌─────────────────────────────────────────────────────────────────────┐
│ Provide, via a second driving transistor of the pixel circuit       │
│ connected between the voltage source and the LED, second current    │
│ $i_A$ from the voltage source to the LED according to a version    │
│ of the gate voltage of the first driving transistor received at a   │
│ gate of the second driving transistor via the switching transistor  │
│                              715                                    │
└─────────────────────────────────────────────────────────────────────┘
```

FIG. 7

BURN-IN COMPENSATION SCHEME FOR LIGHT-EMITTING DIODE BASED DISPLAYS

FIELD OF THE INVENTION

The present disclosure relates generally to display circuits, and specifically relates to a burn-in compensation scheme for light-emitting diode based displays.

BACKGROUND

An organic light-emitting diode (OLED) based display suffers from burn-in and deterioration of performance with its use over time. To compensate for burn-in globally (i.e., for the entire display) and individually (i.e., for individual pixels), current flowing through an OLED in a pixel circuit is increased by raising a gate voltage of a driving transistor of the pixel circuit. However, this approach requires a higher supply voltage for the pixel circuit, which leads to an increase in power consumption.

SUMMARY

Embodiments of the present disclosure relate to a pixel circuit with a burn-in compensation that reduces power consumption. The pixel circuit includes a light-emitting diode (LED), a first driving transistor between a voltage source (VDD) and the LED, a switching transistor coupled to a gate electrode of the first driving transistor, and a second driving transistor connected between the voltage source and the LED. The first driving transistor provides first current from the voltage source to the LED according to a gate voltage of the first driving transistor. The switching transistor is turned on after receiving an enable signal. The second driving transistor provides second current from the voltage source to the LED according to a version of the gate voltage of the first driving transistor received at a gate of the second driving transistor via the switching transistor.

In one or more embodiments, the LED is implemented as an organic light emitting diode (OLED). In one or more other embodiments, the LED is implemented as a micro-LED.

In one or more embodiments, the pixel circuit is integrated into a display comprising an array of pixel circuits, where each of the pixel circuits having a same structure as the pixel circuit. The display may be part of a headset.

BRIEF DESCRIPTION OF THE DRAWINGS

FIG. 7 is a flowchart illustrating a process for operating a pixel circuit in a display, in accordance with one or more embodiments.

Figure 1:
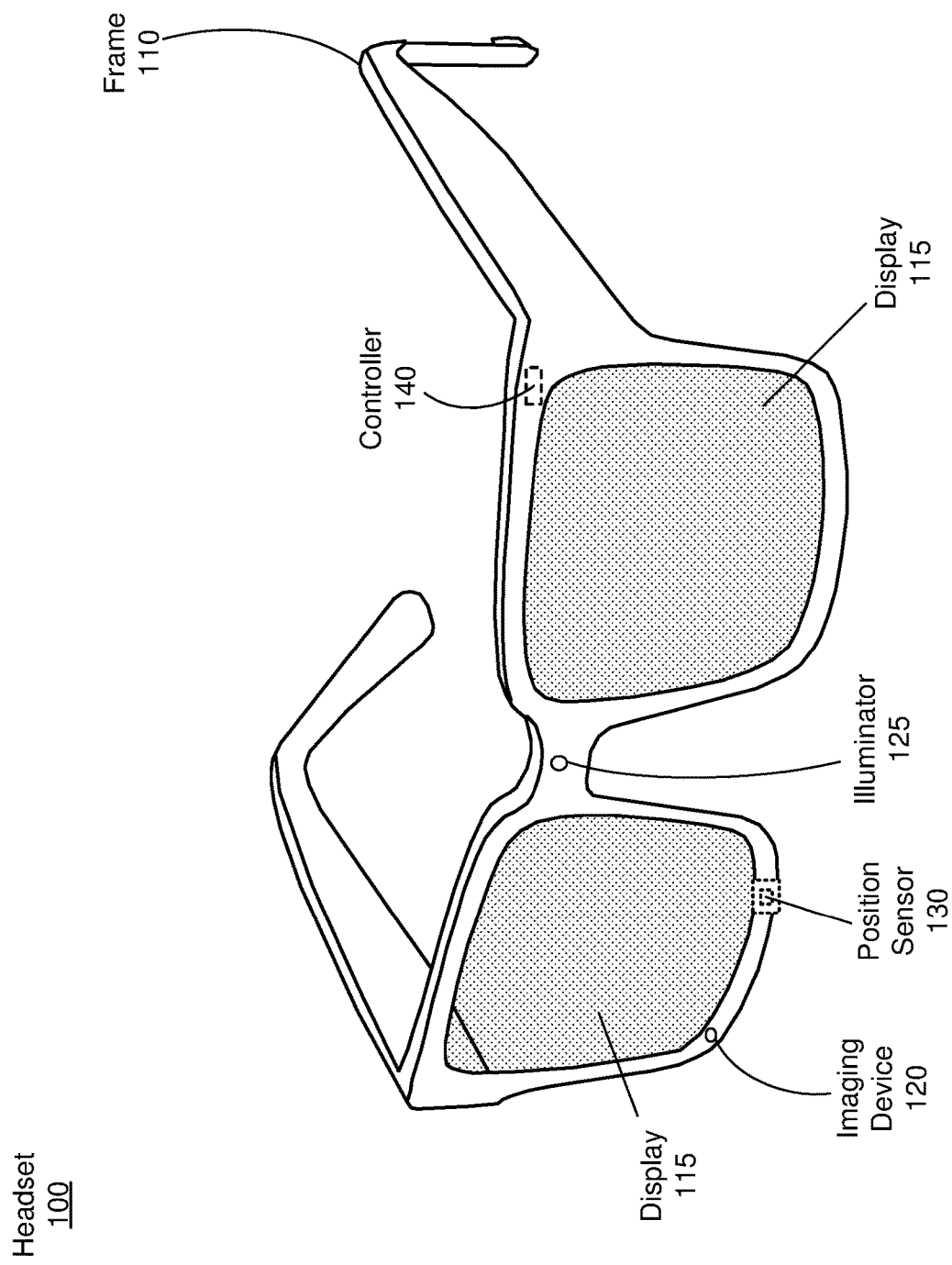
FIG. 1 is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure relate to a pixel circuit with a burn-in compensation that reduces power consumption. An organic light emitting diode (OLED) based display suffers from burn-in and deterioration of performance with its use over time. The deterioration of performance may be tracked in terms of accumulated stress index that takes into account a gray level of displayed images and a temperature of the display during its use. When the performance of the OLED based display deteriorates to a predetermined level, a driving integrated circuit of the display generates an enable signal that turns on additional driving transistors in pixel circuits to provide additional current to OLEDs in pixels of the display. Alternatively, the OLED based display can be subdivided into multiple blocks of pixels and an accumulated stress index can be generated for each block. When the accumulated stress index for the block reaches a predetermined value, the block can be provided with an enable signal to turn on additional driving transistors for the pixels in the block.

The display presented herein may be integrated into a wearable device (e.g., headset), a mobile device, or any other hardware platform capable of providing artificial reality content to a user.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 110, and may include, among other components, a display assembly including one or more displays 115, a depth camera assembly (DCA), a position sensor 130, and a controller 140. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more displays 115 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more displays 115 provide light to a user wearing the headset 100. As illustrated in FIG. 1, the headset includes a display 115 for each eye of a user. In some embodiments, a display 115 generates image light that is provided to an eye box of the headset 100. The eye box is a location in space that an eye of the user occupies while wearing the headset 100. In some embodiments, one or both of the displays 115 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the displays 115 are at least partially transparent, such that light from the local area may be combined with light from the one or more display elements to produce AR and/or MR content. In accordance with embodiments of the present disclosure, each display 115 utilizes an array of light emission elements or pixels (e.g., light-emitting diodes (LEDs), OLEDs, etc.) for emitting image light, wherein each light emission element operates within a pixel circuit implemented with a burn-in compensation. More details about a structure of the display 115 and components of the display 115 are described below in conjunction with FIGS. 2A through 5B.

In some embodiments, the display 115 may include an additional optics block (not shown). The optics block may include one or more optical elements (e.g., lens, Fresnel lens, etc.) that direct light from the display 115 to the eye box. The optics block may, e.g., correct for aberrations in some or all of the image content, magnify some or all of the image, or some combination thereof.

The DCA determines depth information for a portion of a local area surrounding the headset 100. The DCA includes one or more imaging devices 120 and a DCA controller (not shown in FIG. 1), and may also include an illuminator 125. In some embodiments, the illuminator 125 illuminates a portion of the local area with light. The light may be, e.g., structured light (e.g., dot pattern, bars, etc.) in the infrared (IR), IR flash for time-of-flight, etc. In some embodiments, the one or more imaging devices 120 capture images of the portion of the local area that include the light from the illuminator 125. As illustrated, FIG. 1 shows a single illuminator 125 and a single imaging device 120. In alternate embodiments, there is no illuminator 125 and at least two imaging devices 120.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 125), some other technique to determine depth of a scene, or some combination thereof.

The position sensor 130 generates one or more measurement signals in response to motion of the headset 100. The position sensor 130 may be located on a portion of the frame 110 of the headset 100. The position sensor 130 may include an inertial measurement unit (IMU). Examples of position sensor 130 include: one or more accelerometers, one or more gyroscopes, one or more magnetometers, another suitable type of sensor that detects motion, a type of sensor used for error correction of the IMU, or some combination thereof. The position sensor 130 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 120 of the DCA may also function as the PCA. The images captured by the PCA and the depth information determined by the DCA may be used to determine parameters of the local area, generate a model of the local area, update a model of the local area, or some combination thereof. Furthermore, the position sensor 130 tracks the position (e.g., location and pose) of the headset 100 within the room.

The controller 140 may generate emission instructions and provide emission instructions to the illuminator 125 for controlling operation of the illuminator 125. The controller 140 may control, based on the emission instructions, operation of the illuminator 125 to dynamically adjust a pattern of light illuminating the local area, an intensity of the light pattern, a density of the light pattern, location of the light being projected at the local area, etc. The controller 140 may be also configured to determine depth information for one or more objects in the local area based in part on one or more images captured by the imaging device 120. In some embodiments, the controller 140 provides the determined depth information to a console (not shown in FIG. 1) and/or an appropriate module of the headset 100 (e.g., a varifocal module, not shown in FIG. 1). The console and/or the headset 100 may utilize the depth information to, e.g., generate content for presentation on the display 115.

Figure 2A:
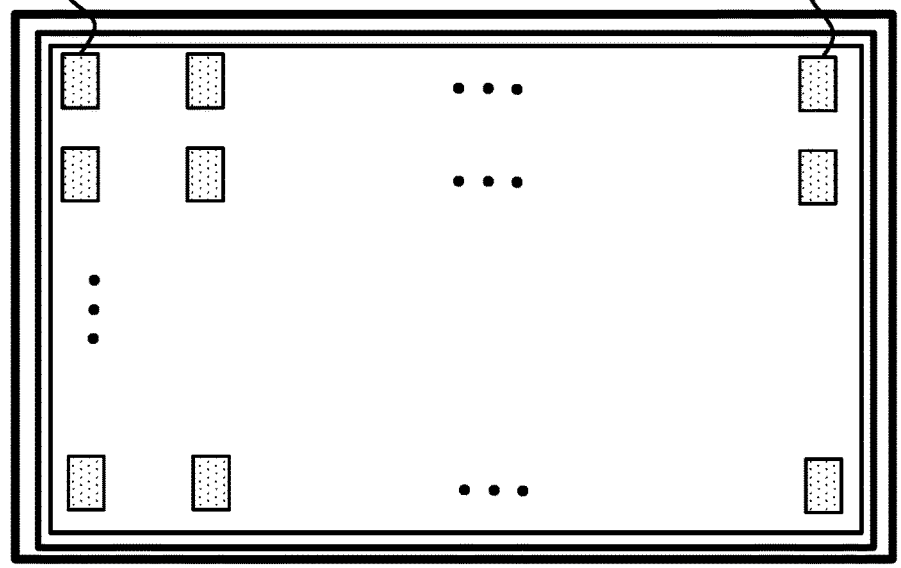
FIG. 2A is an example display with an array of pixel elements, in accordance with one or more embodiments.

FIG. 2A is an example display 200 with an array of pixel elements 205, in accordance with one or more embodiments. The display 200 may be an embodiment of the display 115. Each pixel element 205 in the array may have a same structure (not shown in FIG. 2A). In some embodiments, each pixel element 205 may emit a portion of image light comprising a plurality of color components (e.g., red, green and blue color components). Each pixel element 205 may comprise multiple pixel circuits (e.g., three pixel circuits) of a same structure, and each pixel circuit in the pixel element 205 may emit light of a corresponding color component (e.g., red color, green color, or blue color). In some other embodiments, each pixel element 205 may comprise a single pixel circuit emitting light of a specific intensity (i.e., gray level). The burn-in compensation for the display 200 can be activated by activating simultaneously (or almost simultaneously) burn-in compensations for all pixel circuits of all the pixel elements 205 in the display 200. Details about a structure of the pixel circuit of the pixel element 205 and activation of the burn-in compensation for the display 200 are described below in conjunction with FIGS. 3A through 4B.

Figure 2B:
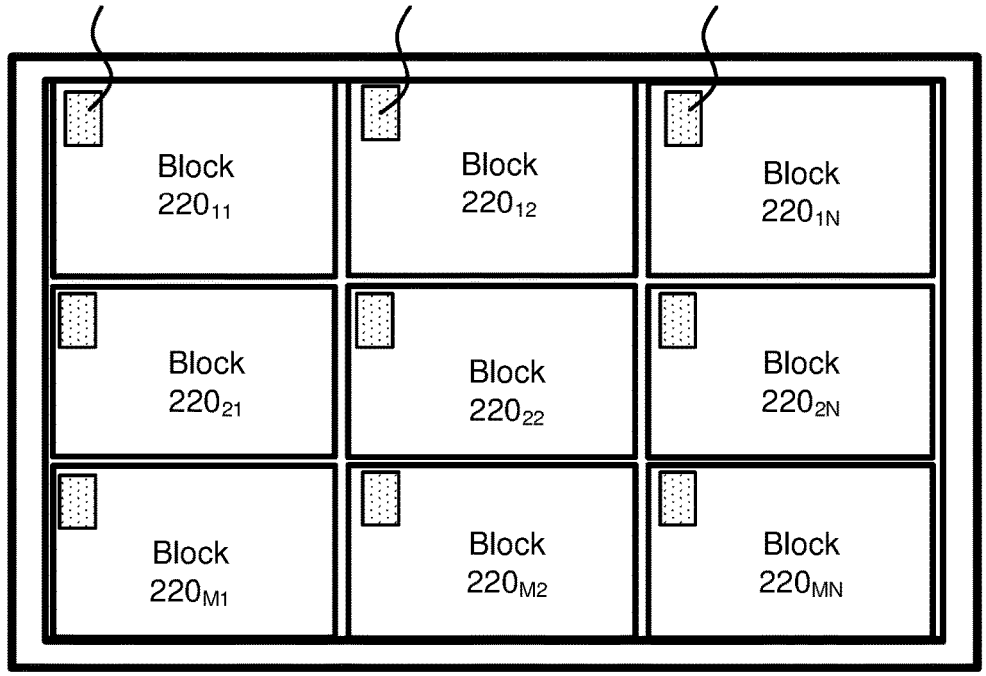
FIG. 2B is an example display with an array of pixel elements organized into multiple blocks, in accordance with one or more embodiments.

FIG. 2B is an example display 210 with an array of pixel elements 215 organized into multiple blocks, in accordance with one or more embodiments. The display 210 may be an embodiment of the display 115. Each pixel element 215 in the array may have the same structure as the pixel elements 205 of in FIG. 2A. Thus, each pixel element 215 may comprise multiple (e.g., three) pixel circuits, each emitting light a corresponding color component. Alternatively, each pixel element 215 may comprise a single pixel circuit emitting light of a specific intensity (i.e., gray level). As shown in FIG. 2B, the pixel elements 215 of the display 210 may be organized into multiple blocks of pixel elements, e.g., blocks $220_{11}$, ..., $220_{1N}$, ..., $220_{M1}$, $220_{MN}$, where M and N are integers (e.g., M=N=2 or M=N=3). In the embodiment of FIG. 2B, the burn-in compensation is separately and independently activated for each block $220_{11}$, ..., $220_{1N}$, ..., $220_{M1}$, $220_{MN}$ by activating separately and independently all pixel circuits of all the pixel elements 215 in each block $220_{11}$, ..., $220_{1N}$, ..., $220_{M1}$, $220_{MN}$. Details of the per-block activation of burn-in compensation are described below in conjunction with FIGS. 5A and 5B.

Figure 3A:
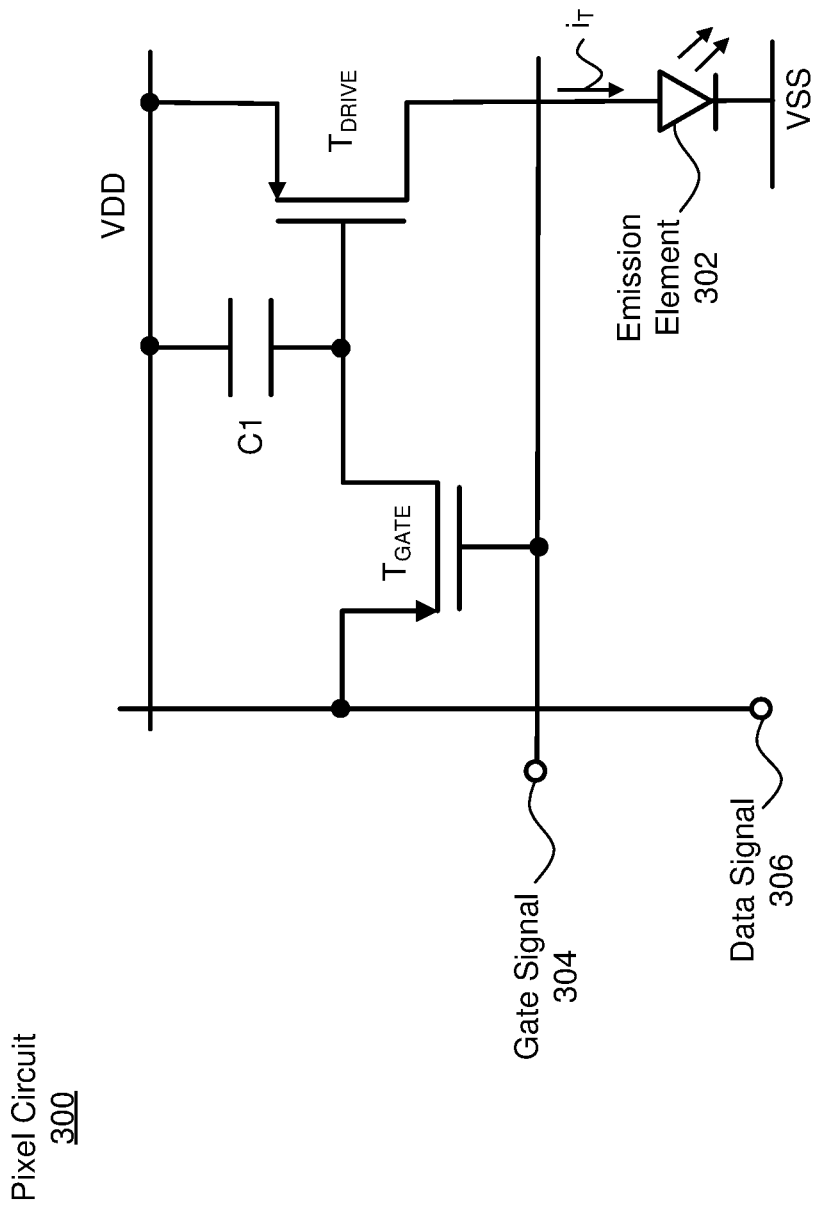
FIG. 3A is an example schematic of a pixel circuit with a single driving transistor, in accordance with one or more embodiments.

FIG. 3A is an example schematic of a pixel circuit 300 with a single driving transistor $T_{DRIVE}$, in accordance with one or more embodiments. The driving transistor $T_{DRIVE}$ provides a current $i_T$ from a first voltage source (VDD or high supply voltage) to an emission element 302 of the pixel circuit 300 according to a gate voltage of the driving transistor. The driving transistor $T_{DRIVE}$ is between the first voltage source VDD and the emission element 302 that is further coupled to a second voltage source (VSS or low supply voltage).

The emission element 302 emits light having an intensity level in accordance with a level of current $i_T$ through the emission element 302. The emission element 302 may be implemented as a LED, micro-LED, OLED, or some other element that emits light based a level of current flowing through the emission element 302. The light emitted by the emission element 302 may be light of a specific color component (e.g., red light, green light, or blue light). Alternatively, the light emitted by the emission element 302 may be monochrome light (i.e., gray light).

The pixel circuit 300 further includes a gate transistor $T_{GATE}$ coupled to the gate of the driving transistor $T_{DRIVE}$. The gate transistor $T_{GATE}$ may control the voltage at the gate of the driving transistor $T_{DRIVE}$ (i.e., the gate voltage). The gate transistor $T_{GATE}$ is turned on when a gate signal 304 provided to a gate of the gate transistor $T_{GATE}$ turns low. After the gate transistor $T_{GATE}$ is turned on, a voltage at the gate of the driving transistor $T_{DRIVE}$ (which is also a drain of the gate transistor $T_{GATE}$) is determined by a level of a data signal 306 provided to a source of the gate transistor $T_{GATE}$. Thus, a level of current $i_T$ provided by the driving transistor $T_{DRIVE}$ to the emission element 302 depends on a level of the data signal 306. The gate voltage of the driving transistor $T_{DRIVE}$ that determines the level of current may be maintained in a stable manner by a capacitor C1 between the first voltage source VDD and the gate of the driving transistor $T_{DRIVE}$.

Figure 3B:
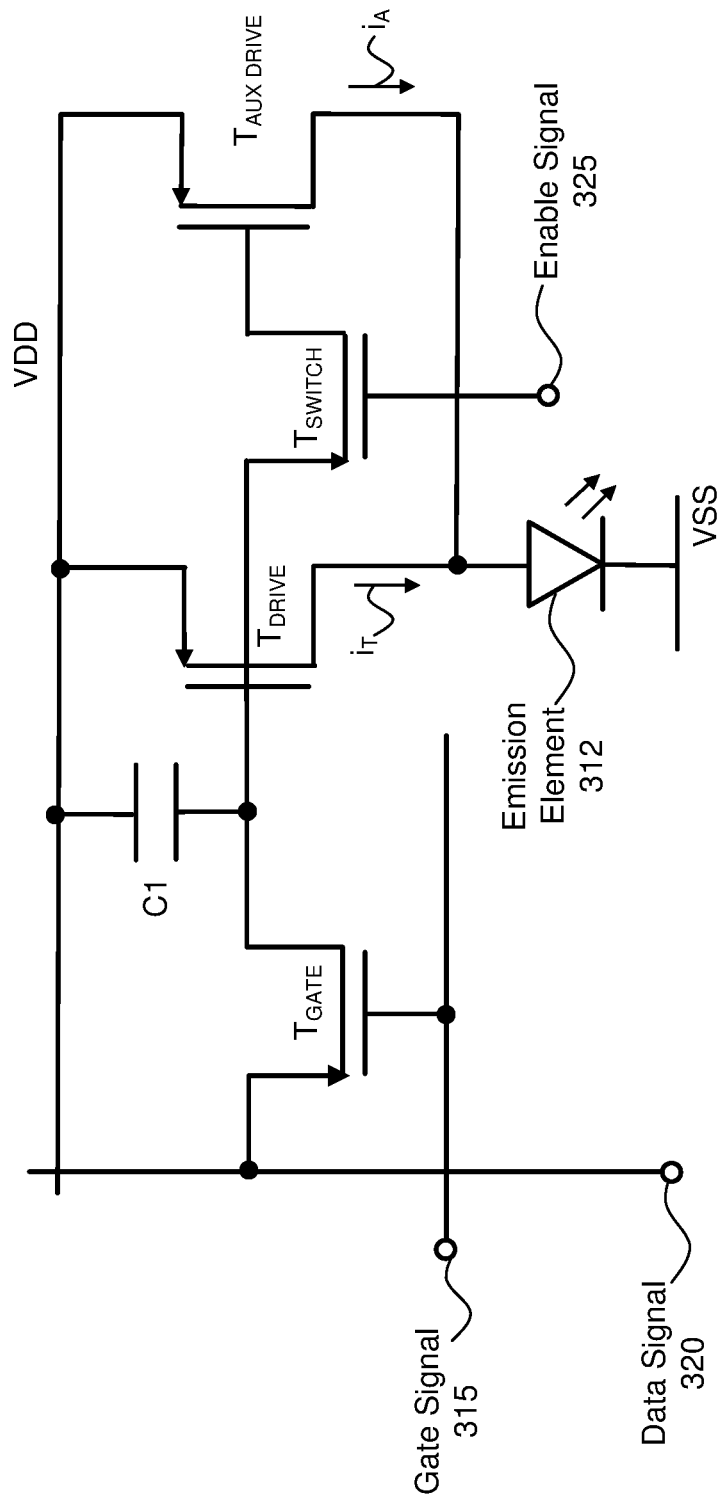
FIG. 3B is an example schematic of a pixel circuit with a pair of driving transistors, in accordance with one or more embodiments.

FIG. 3B is an example schematic of a pixel circuit 310 with a pair of driving transistors $T_{DRIVE}$, $T_{AUX\ DRIVE}$ for a burn-in compensation, in accordance with one or more embodiments. The pixel circuit 310 includes a first driving transistor $T_{DRIVE}$, a second (i.e., auxiliary) driving transistor $T_{AUX\ DRIVE}$, a gate transistor $T_{GATE}$, a switching transistor $T_{SWITCH}$, and an emission element 312. Relative to the embodiment of FIG. 3A, the second driving transistor $T_{AUX\ DRIVE}$ and the switching transistor $T_{SWITCH}$ are added to the embodiment of FIG. 3B in order to provide an additional (i.e., auxiliary or second) current $i_A$ to the emission element 312. The first driving transistor $T_{DRIVE}$ provides a first current $i_T$ from a first voltage source (VDD or high supply voltage) to the emission element 312 according to a gate voltage of the first driving transistor $T_{DRIVE}$. The first driving transistor $T_{DRIVE}$ is between the first voltage source VDD and the emission element 312 that is further coupled to a second voltage source (VSS or low supply voltage).

The emission element 312 emits light having an intensity level in accordance with a level of the first current $i_T$ that flows from the first voltage source VDD and through the first driving transistor $T_{DRIVE}$ to the emission element 312. The emission element 312 may be implemented as a LED, micro-LED, OLED, or some other element that emits light based a level of current flowing through the emission element 312. The light emitted by the emission element 312 may be light of a specific color component (e.g., red light, green light, or blue light). Alternatively, the light emitted by the emission element 312 may be monochrome light (i.e., gray light).

The gate transistor $T_{GATE}$ controls a voltage level at a gate of the first driving transistor $T_{DRIVE}$, as well as to a gate of the second driving transistor $T_{AUX\ DRIVE}$ (when the switching transistor $T_{SWITCH}$ is turned on). The gate transistor $T_{GATE}$ is turned on when a gate signal 315 provided to a gate of the gate transistor $T_{GATE}$ turns low. After the gate transistor $T_{GATE}$ is turned on, a voltage level at the gate of the first driving transistor $T_{DRIVE}$ (which is also a drain of the gate transistor $T_{GATE}$) is determined by a level of a data signal 320 provided to a source of the gate transistor $T_{GATE}$. Thus, a level of the first current $i_T$ provided by the first driving transistor $T_{DRIVE}$ to the emission element 312 depends on a level of the data signal 320. The gate voltage of the first driving transistor $T_{DRIVE}$ that determines the level of first current $i_T$ (as well as a level of the second current $i_A$) may be maintained in a stable manner by a capacitor C1 between the first voltage source VDD and the gate of the first driving transistor $T_{DRIVE}$.

When turned on, the switching transistor $T_{SWITCH}$ provides the burn-in compensation for the emission element 312. The switching transistor $T_{SWITCH}$ provides a version of the gate voltage of the first driving transistor $T_{DRIVE}$ to a gate of the second driving transistor $T_{AUX\ DRIVE}$ (e.g., the gate voltage of the first driving transistor $T_{DRIVE}$ decreased by a voltage drop across the switching transistor $T_{SWITCH}$). The switching transistor $T_{SWITCH}$ is then turned on when an enable signal 325 at a gate of the switching transistor $T_{SWITCH}$ is received or turned low.

The turning-on of the switching transistor $T_{SWITCH}$ also activates the burn-in compensation for the emission element 312 by activating the second driving transistor $T_{AUX\ DRIVE}$. A gate voltage at the second driving transistor $T_{AUX\ DRIVE}$ (which is also a drain voltage of the switching transistor $T_{SWITCH}$) provided by the activated switching transistor $T_{SWITCH}$ turns on the second driving transistor $T_{AUX\ DRIVE}$. Like the first driving transistor $T_{DRIVE}$, the second driving transistor $T_{AUX\ DRIVE}$ is connected between the first voltage source VDD and the emission element 312, i.e., the first and second driving transistors $T_{DRIVE}$ and $T_{AUX\ DRIVE}$ are connected in parallel. The second driving transistor $T_{AUX\ DRIVE}$ provides the second current ($i_A$) from the first voltage source VDD to the emission element 312 according to the version of gate voltage of the first driving transistor $T_{DRIVE}$ received at a gate of the second driving transistor $T_{AUX\ DRIVE}$ via the switching transistor $T_{SWITCH}$. Thus, when the enable signal 325 is provided to the switching transistor $T_{SWITCH}$ (i.e., when the burn-in compensation for the emission element 312 is activated), a combined current (i.e., the combination of the first current $i_T$ and the second current $i_A$) through the emission element 312 is increased from the first current $i_T$ to a sum of the first current and the second current ($i_T+i_A$), thus providing the burn-in compensation to the emission element 312 without an increase in supply voltage.

The burn-in compensation of the emission element 312 is thus achieved by adding the switching transistor $T_{SWITCH}$ and the second driving transistor $T_{AUX\ DRIVE}$ to the pixel circuit 310 (in comparison with the pixel circuit 300). Both the switching transistor $T_{SWITCH}$ and the second driving transistor $T_{AUX\ DRIVE}$ may have a small size—substantially smaller size (i.e., smaller width) in comparison with the first driving transistor $T_{DRIVE}$. For example, a size (e.g., width) of the second driving transistor $T_{AUX\ DRIVE}$ may be approximately eight times less than a size (e.g., width) of the first driving transistor $T_{DRIVE}$. Details about conditions for generating the enable signal 325 and activation of the burn-in compensation in the pixel circuit 310 are described below in conjunction with FIGS. 4A through 6B.

Figure 4A:
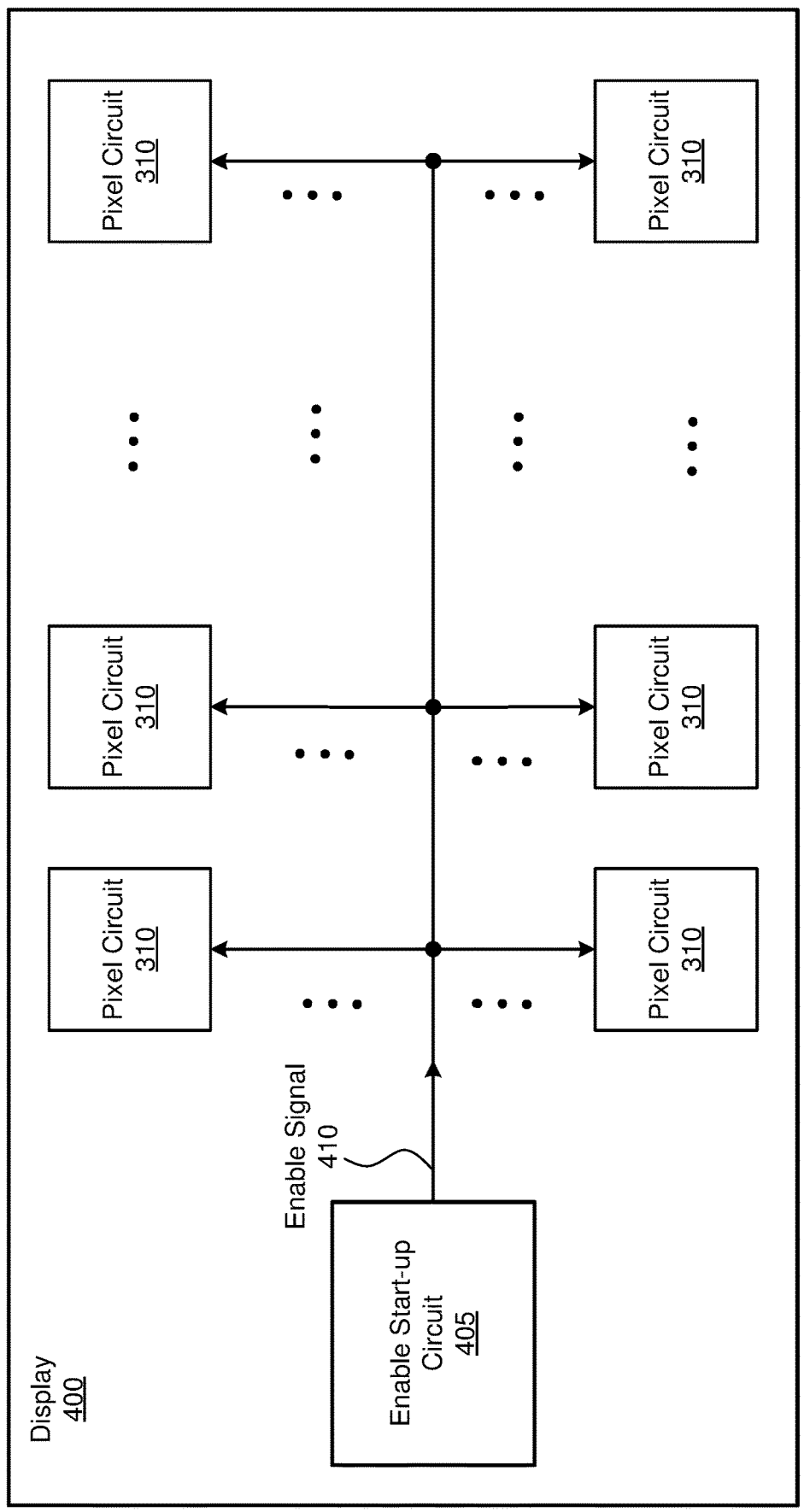
FIG. 4A is a block diagram of a display with a single enable signal provided to an array of pixel circuits, in accordance with one or more embodiments.

FIG. 4A is a block diagram of a display 400 with a single enable signal provided to an array of pixel circuits 310, in accordance with one or more embodiments. The display 400 may be an embodiment of the display 115 and/or the display 200. In addition to the array of pixel circuits 310, the display 400 may include an enable start-up circuit 405 coupled to each pixel circuit 310. Each pixel circuit 310 of the display 400 is implemented as illustrated in FIG. 3B. All the pixel circuits 310 of the display 400 may share a single enable signal 410 generated by the enable start-up circuit 405. The enable signal 410 may correspond to the enable signal 325 of FIG. 3B.

Figure 4B:
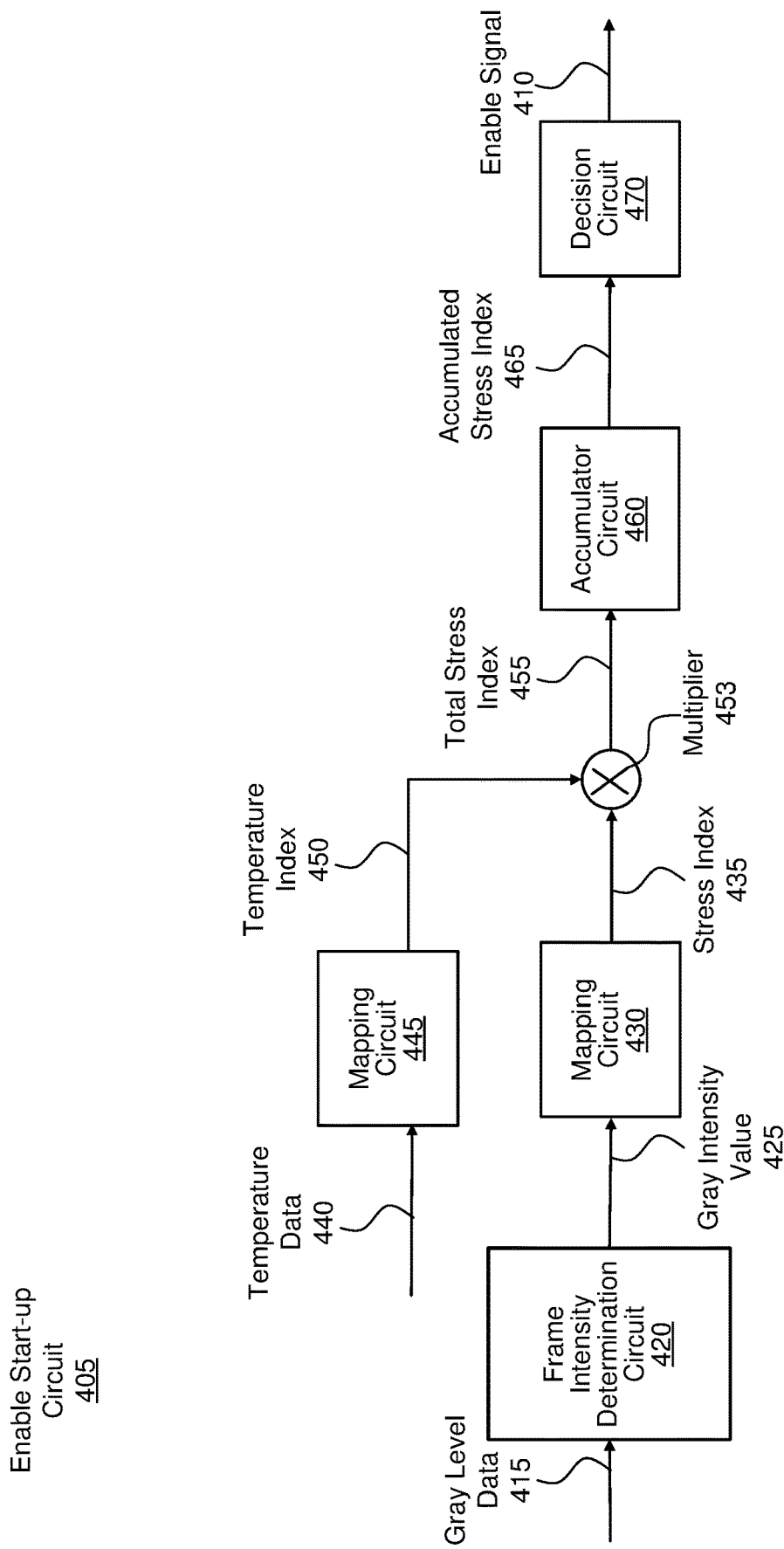
FIG. 4B is an example block diagram of an enable start-up circuit that generates an enable signal in FIG. 4A, in accordance with one or more embodiments.

FIG. 4B is an example block diagram of the enable start-up circuit 405 that generates the enable signal 410. The enable start-up circuit 405 may include a frame intensity determination circuit 420, a mapping circuit 430 coupled to the frame intensity determination circuit 420, a mapping circuit 445, a multiplier 453 coupled to the mapping circuits 430 and 445, an accumulator circuit 460 coupled to the multiplier circuit 453, and a decision circuit 470 coupled to the accumulator circuit 460. There may be more or fewer components of the enable start-up circuit 405 than what is shown in FIG. 4B.

The frame intensity determination circuit 420 may receive gray level data 415 related to, e.g., gray levels of light emitted by pixels of a display (e.g., emission elements of the pixel circuits 310) for each image frame of a plurality of image frames. Based on the gray level data 415, the frame intensity determination circuit 420 may determine a gray intensity value 425 for each of the image frames, e.g., as an average value of intensities of light emitted by the pixels of the display. Alternatively, the frame intensity determination circuit 420 may determine the gray intensity value 425 as a median intensity value, an average of pixel intensities above a threshold value, or some other intensity value related to light emitted by the pixels of the display for each image frame. The frame intensity determination circuit 420 may provide the gray intensity value 425 to the mapping circuit 430.

The mapping circuit 430 may map the gray intensity value 425 to a stress index 435 for each image frame. The stress index 435 represents an index value that characterizes a level of burn-in (i.e., "stress") for emission elements (e.g., OLEDs) of the pixels in the display for a corresponding image frame. As the level of burn-in per image frame is higher, the stress index 435 is higher and vice versa. The mapping circuit 430 may perform the mapping based on, e.g., a look-up table (LUT) that includes a list of stress index values for different gray intensity values. The list of stress index values for different gray intensity values may be pre-determined and stored in the LUT. The LUT may be part of a non-transitory computer-readable storage medium (i.e., memory) of the mapping circuit 430.

The mapping circuit 445 may map temperature data 440 (e.g., one or more temperature values) associated with the display to a temperature index 450. The temperature data 440 may include information about one or more temperature values measured at one or more pixel elements of the display, e.g., by one or more temperature sensors during operation of the display. The temperature data 440 may include one or more analog temperature values associated with one or more locations (e.g., one or more pixel elements) of the display. The temperature index 450 determined by the mapping circuit 445 may be a digital value that is proportional to the one or more analog temperature values of the temperature data 440. The mapping circuit 445 may perform the mapping based on, e.g., a LUT that includes a list of temperature index values for different values of temperatures. The list of temperature index values for different temperature values may be pre-determined and stored in the LUT, e.g., based on evaluation of the display at different operating temperatures. The LUT may be part of a non-transitory computer-readable storage medium (i.e., memory) of the mapping circuit 445.

The multiplier circuit 453 is a digital multiplier that computes a total stress index 455 for each image frame by multiplying the stress index 435 and the temperature index 450. The multiplier circuit 453 provides the total stress index 455 for one image frame to the accumulator circuit 460. In some embodiments, the multiplier circuit 453 may be replaced by, e.g., a combining circuit that combines in a predefined manner the stress index 435 and the temperature index 450 to generate the total stress index 455.

The accumulator circuit 460 may determine an accumulated stress index 465 by accumulating, over a time period, a plurality of total stress indexes 455 across the plurality of image frames. Since the time period for the accumulation may be extensive (e.g., more than a year or multiple years), the accumulator circuit 460 may be implemented with enough precision and memory to accumulate total stress indexes 455 during the accumulation time period. The accumulator circuit 460 may provide the accumulated stress index 465 to the decision circuit 470.

The decision circuit 470 generates the enable signal 410 when the accumulated stress index 465 exceeds a threshold stress index value. The decision circuit 470 may be implemented as a digital comparator circuit that compares a digital value (e.g., binary value) of the accumulated stress index 470 with a pre-stored digital value (e.g., binary value) of the threshold stress index value. The threshold stress index value may be associated with a level of luminosity of emission elements (e.g., OLEDs) in the display (e.g., an average level of luminosity of OLEDs, or a median level of luminosity of OLEDs) that is decreased over time to a threshold luminosity level, e.g., a luminosity level of 95% of an original luminosity level of the OLEDs in the display. In this manner, the enable signal 410 may be generated to activate the burn-in compensation at the pixel circuits 310 when a luminosity of the display (e.g., average or median luminosity of the display) decreases from the original (e.g., average or median) luminosity level to the threshold luminosity level (e.g., 95% of the original luminosity level).

The enable start-up circuit 405 may be turned off after a pre-determined time period after the generation of enable signal 410. A hold circuit (not shown in FIG. 4B) may be coupled to an output of the enable start-up circuit 405 (connected to the pixel circuits 310) to preserve a voltage level of the enable signal 410 for the pixel circuits 310 after the enable start-up circuit 405 is turned off.

Figure 5A:
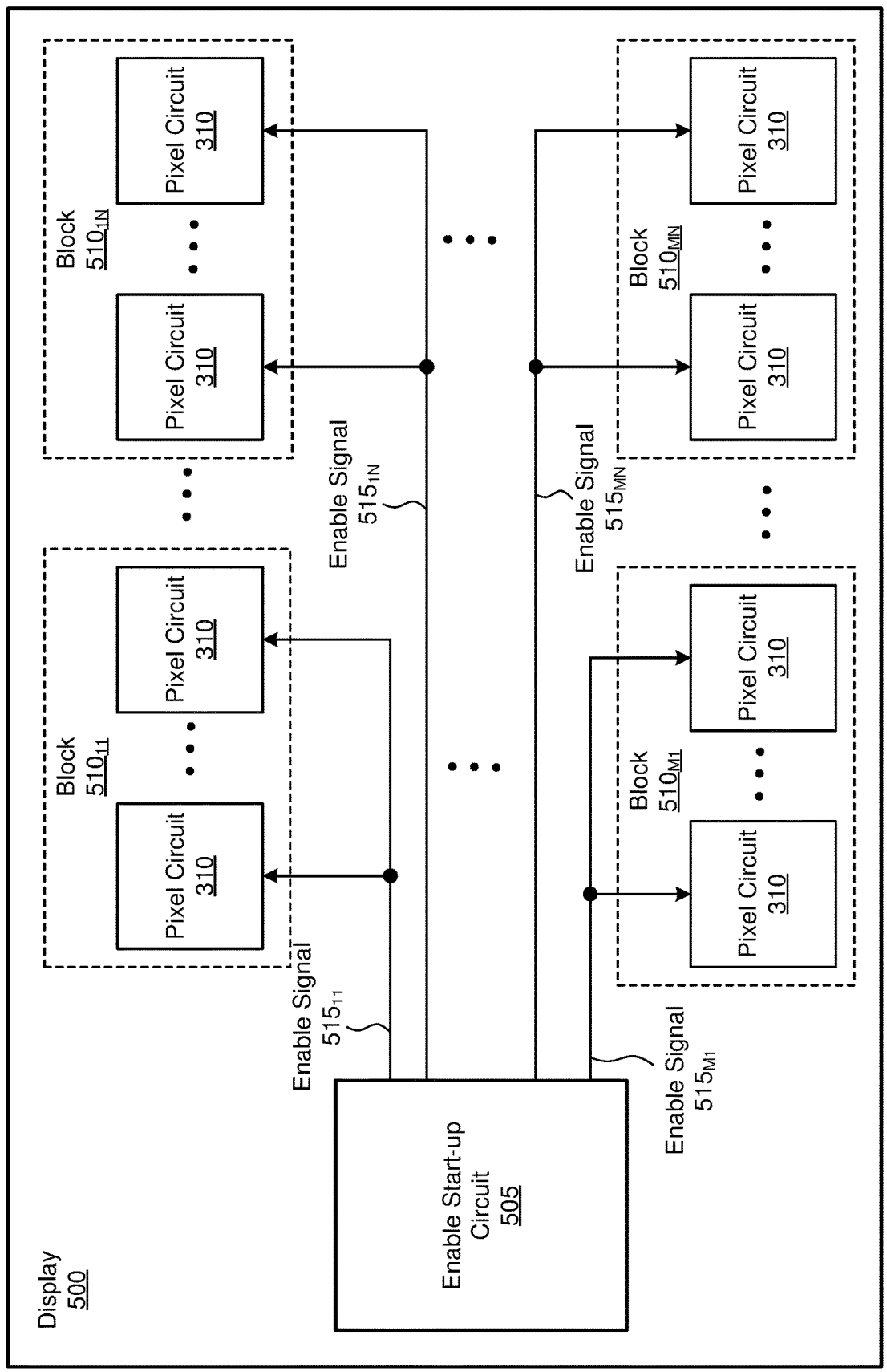
FIG. 5A is a block diagram of a display with multiple enable signals provided to different blocks of pixel circuits, in accordance with one or more embodiments.

FIG. 5A is a block diagram of a display 500 with multiple enable signals provided to different blocks of pixel circuits, in accordance with one or more embodiments. The display 500 may be an embodiment of the display 115 and/or the display 210. The display 500 may include an enable start-up circuit 505 coupled to an array of pixel circuits 310 organized into different blocks, i.e., blocks $510_{11}, \ldots, 510_{1N}, 510_{M1}, 510_{MN}$, where M and N are integers (e.g., M=N=2, or M=N=3). Each block $510_{11}, \ldots, 510_{1N}, 510_{M1}, 510_{MN}$ may comprise a respective number of pixel circuits each implemented as illustrated in FIG. 3B. In one or more embodiments, each block $510_{11}, \ldots, 510_{1N}, 510_{M1}, 510_{MN}$ may include a same number of pixel circuits. Alternatively, the blocks $510_{11}, \ldots, 510_{1N}, 510_{M1}, 510_{MN}$ may comprise a different number of pixel circuits. The burn-in compensation for the pixel circuits 310 in each block $510_{11}, \ldots, 510_{1N}, 510_{M1}, 510_{MN}$ may be independently controlled by different enable signals generated by the enable start-up circuit 505. The enable start-up circuit 505 may independently generate enable signals $515_{11}, \ldots, 515_{1N}, 515_{M1}, 515_{MN}$ provided to all pixel circuits 310 in respective blocks $510_{11}, \ldots, 510_{1N}, 510_{M1}, 510_{MN}$.

In some embodiments, instead of dividing up the display 500 into blocks of pixel circuits 310 (as shown in FIG. 5A), different enable signals generated by the enable start-up circuit 505 may be provided individually to various pixel circuits 310, while the burn-in compensation for some portion of the pixel circuits 310 may be controlled by a single enable signal from the enable start-up circuit 505. Alternatively, at least some of the pixel circuits 310 may include their own enable start-up circuits, such as the enable start-up circuit 505.

Figure 5B:
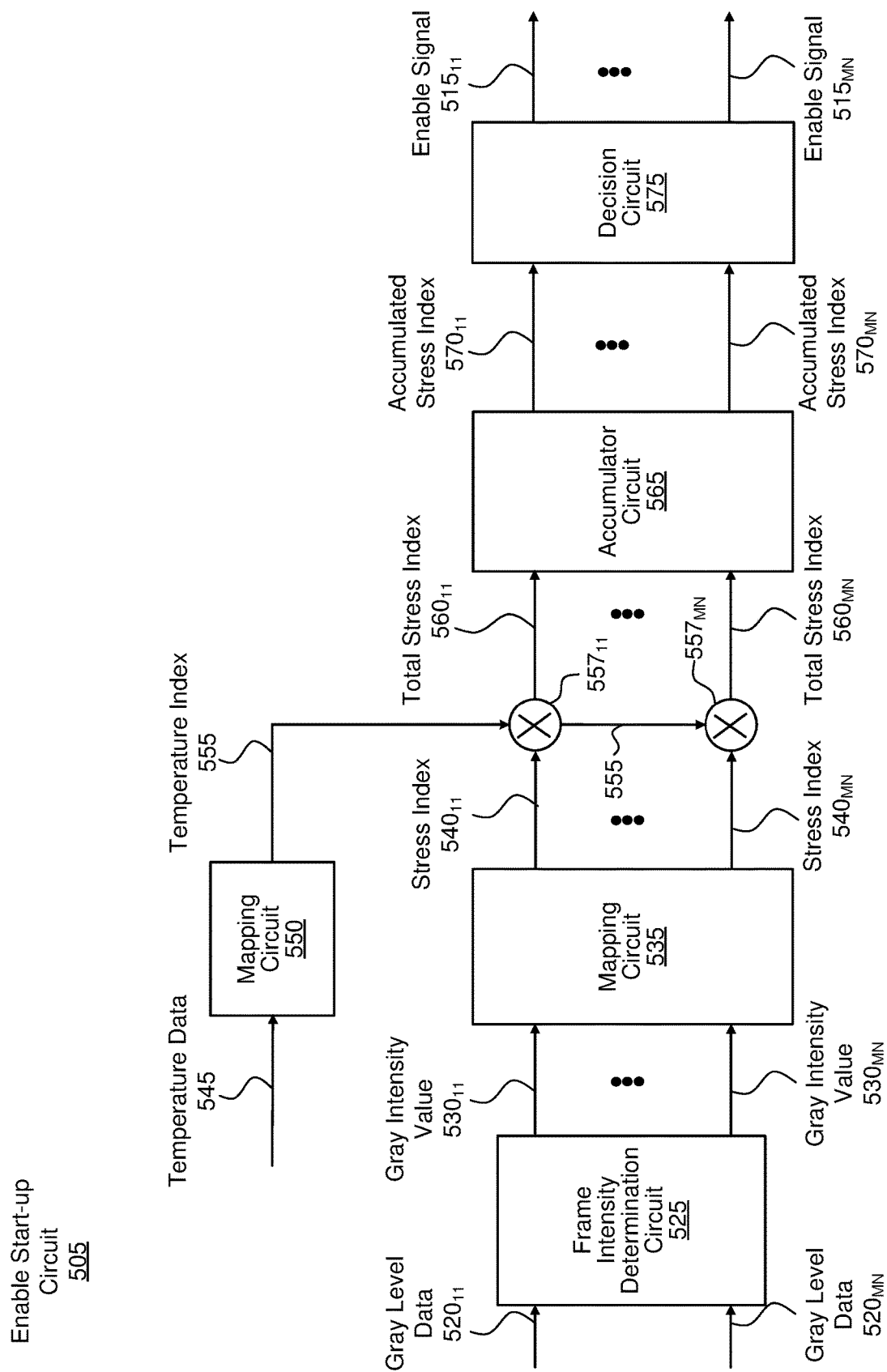
FIG. 5B is an example block diagram of an enable start-up circuit that generates enable signals in FIG. 5A, in accordance with one or more embodiments.

FIG. 5B is an example block diagram of the enable start-up circuit 505 that generates the enable signals $515_{11}, \ldots, 515_{1N}, 515_{M1}, 515_{MN}$ for respective blocks $510_{11}, \ldots, 510_{1N}, 510_{M1}, 510_{MN}$. The enable start-up circuit 505 may include a frame intensity determination circuit 525, a mapping circuit 535 coupled to the frame intensity determination circuit 525, a mapping circuit 550, multiplier circuits $557_{11}, \ldots, 557_{MN}$ coupled to the mapping circuits 535 and 550, an accumulator circuit 565 coupled to the multipliers $557_{11}, \ldots, 557_{MN}$, and a decision circuit 575 coupled to the accumulator circuit 565. There may be more or fewer components of the enable start-up circuit 505 than what is shown in FIG. 5B.

The frame intensity determination circuit 525 may receive gray level data $520_{11}, \ldots, 520_{MN}$ related to, e.g., gray levels of light emitted by pixels (e.g., emission elements of pixel circuits 310) of respective blocks $510_{11}, \ldots, 510_{MN}$, for each image frame of a plurality of image frames. Based on the gray level data $520_{11}, \ldots, 520_{MN}$, the frame intensity determination circuit 525 may determine gray intensity values $530_{11}, \ldots, 530_{MN}$ for respective blocks $510_{11}, \ldots, 510_{MN}$ for each image frame. The frame intensity determination circuit 525 may determine the gray intensity values $530_{11}, \ldots, 530_{MN}$, e.g., as average intensity values, median intensity values, or some other statistics of intensities of light emitted by the pixels of respective blocks $510_{11}, \ldots, 510_{MN}$ for each image frame. The frame intensity determination circuit 525 may provide the gray intensity values $530_{11}, \ldots, 530_{MN}$ to the mapping circuit 535.

The mapping circuit 535 may map the gray intensity values $530_{11}, \ldots, 530_{MN}$ to respective stress indexes $540_{11}, \ldots, 540_{MN}$ for respective blocks $510_{11}, \ldots, 510_{MN}$ for each image frame. The mapping circuit 535 may perform the mapping based on, e.g., a LUT that includes a list of predetermined stress index values for different gray intensity values. The LUT may be part of a non-transitory computer-readable storage medium (i.e., memory) of the mapping circuit 535.

The mapping circuit 550 may map temperature data 545 (e.g., one or more temperature values) associated with the display to a temperature index 555. The temperature data 545 may include information about one or more temperature values measured at one or more pixel coordinates of the display, e.g., by one or more temperature sensors during operation of the display. The measured temperature data 545 may comprise one or more analog temperature values, and the temperature index 555 may be a digital value, e.g., proportional to the one or more analog temperature values. The mapping circuit 550 may perform the mapping based on, e.g., a LUT that includes a list of predetermined temperature index values for different measured temperature values. The LUT may be part of a non-transitory computer-readable storage medium (i.e., memory) of the mapping circuit 550.

Each multiplier circuit $557_{11}, \ldots, 557_{MN}$ is a digital multiplier that computes a respective total stress index $560_{11}, \ldots, 560_{MN}$ for a respective block $510_{11}, \ldots, 510_{MN}$ for each image frame by multiplying the respective stress index $540_{11}, \ldots, 540_{MN}$ and the temperature index 555. The multiplier circuits $557_{11}, \ldots, 557_{MN}$ provide the computed total stress indexes $560_{11}, \ldots, 560_{MN}$ for one image frame to the accumulator circuit 565. In some embodiments, one or more multiplier circuits $557_{11}, \ldots, 557_{MN}$ may be replaced by, e.g., one or more corresponding combining circuits that combine in a predefined manner one or more corresponding stress indexes $540_{11}, \ldots, 540_{MN}$ and the temperature index 555 to generate one or more corresponding total stress indexes $560_{11}, \ldots, 560_{MN}$.

The accumulator circuit 565 may determine accumulated stress indexes $570_{11}, \ldots, 570_{MN}$ for respective blocks $510_{11}, \ldots, 510_{MN}$ by accumulating, over a time period, a plurality of total stress indexes $560_{11}, \ldots, 560_{MN}$ for each block $510_{11}, \ldots, 510_{MN}$ across the plurality of image frames. Since the time period for the accumulation at the accumulator circuit 565 may be extensive (e.g., more than a year, or more than several years), the accumulator circuit 565 may be implemented with a sufficient precision and memory space to accumulate a large number of total stress indexes $560_{11}, \ldots, 560_{MN}$ for each block $510_{11}, \ldots, 510_{MN}$ across the plurality of image frames. The accumulator circuit 565 may provide the accumulated stress indexes $570_{11}, \ldots, 570_{MN}$ to the decision circuit 575.

The decision circuit 575 generates the enable signals $515_{11}, \ldots, 515_{MN}$ for respective blocks $510_{11}, \ldots, 510_{MN}$ when each accumulated stress index $570_{11}, \ldots, 570_{MN}$ from the accumulator circuit 565 exceeds a corresponding threshold stress index value for each block $510_{11}, \ldots, 510_{MN}$. A threshold stress index value may be same for all the blocks $510_{11}, \ldots, 510_{MN}$. Alternatively, the blocks $510_{11}, \ldots, 510_{MN}$ may have different threshold stress index values (e.g., when the number of pixel circuits 310 is not the same in each block). The decision circuit 575 may be implemented as a digital comparator circuit that compares a digital value (e.g., binary value) of each accumulated stress index $570_{11}, \ldots, 570_{MN}$ with a pre-stored digital value (e.g., binary value) of the corresponding threshold stress index value. The corresponding threshold stress index value may be associated with a level of luminosity (e.g., average or median level of luminosity) of emission elements (e.g., OLEDs) integrated into a corresponding block $510_{11}, \ldots, 510_{MN}$ that is decreased over time to a corresponding threshold luminosity level, e.g., a luminosity level of 95% of an original luminosity level for the corresponding block $510_{11}, \ldots, 510_{MN}$. In this manner, each enable signal $515_{11}, \ldots, 515_{MN}$ is generated to activate the burn-in compensation at the corresponding block $510_{11}, \ldots, 510_{MN}$ when the luminosity level (e.g., average or median luminosity) of the corresponding block $510_{11}, \ldots, 510_{MN}$ is decreased from the original luminosity level to the threshold luminosity level (e.g., 95% of the original luminosity level).

The enable start-up circuit 505 may be turned off after a pre-determined time period after the generation of enable signals $515_{11}, \ldots, 515_{MN}$. Hold circuits (not shown in FIG. 5B) may be coupled to outputs of the enable start-up circuit 505 (connected to pixel circuits 310 in corresponding blocks $510_{11}, \ldots, 510_{MN}$) to preserve voltage levels of the enable signals $515_{11}, \ldots, 515_{MN}$ for the pixel circuits in all blocks $510_{11}, \ldots, 510_{MN}$ after the enable start-up circuit 505 is turned off.

Figure 6A:
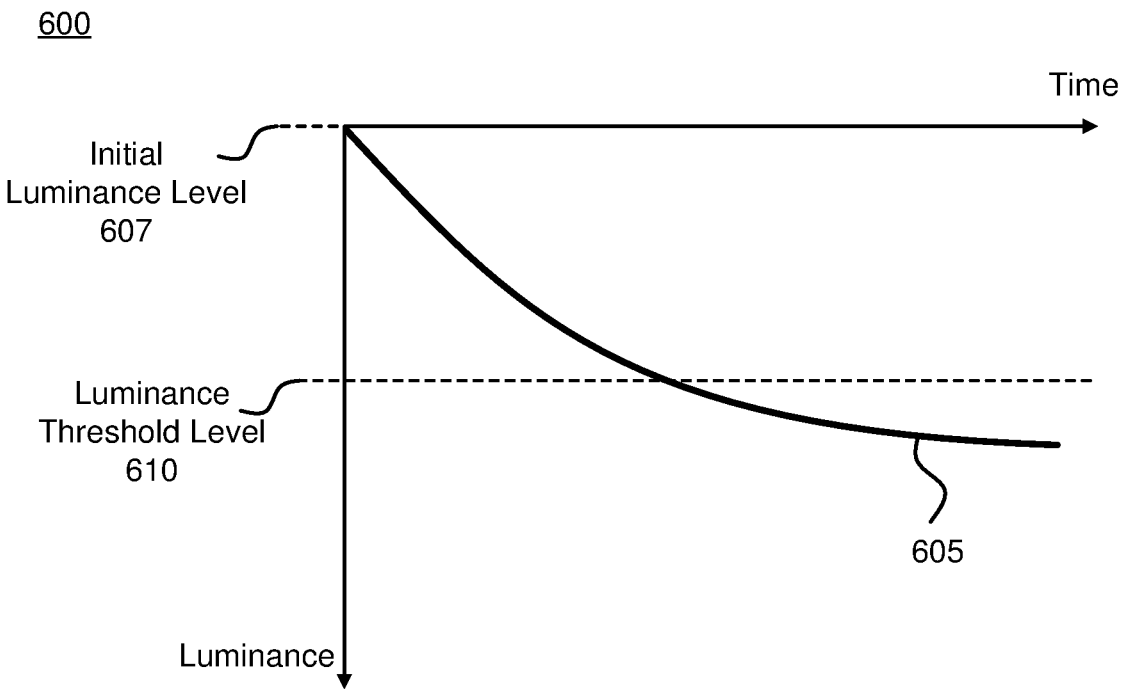
FIG. 6A is a graph of a luminance of an organic light emitting diode (OLED) over time without a burn-in compensation, in accordance with one or more embodiments

FIG. 6A is an example graph 600 of a luminance of an OLED over time without a burn-in compensation, in accordance with one or more embodiments. A plot 605 illustrates the OLED luminance as a function of time. It can be observed that the OLED luminance starts at an initial luminance level 607 and decreases over time. At some point in time, without the burn-in compensation, the OLED luminance decreases below a luminance threshold level 610 (e.g., 95% of the initial luminance level 607) and continues to decrease, i.e., performance of the OLED continues to deteriorate over time without the burn-in compensation.

Figure 6B:
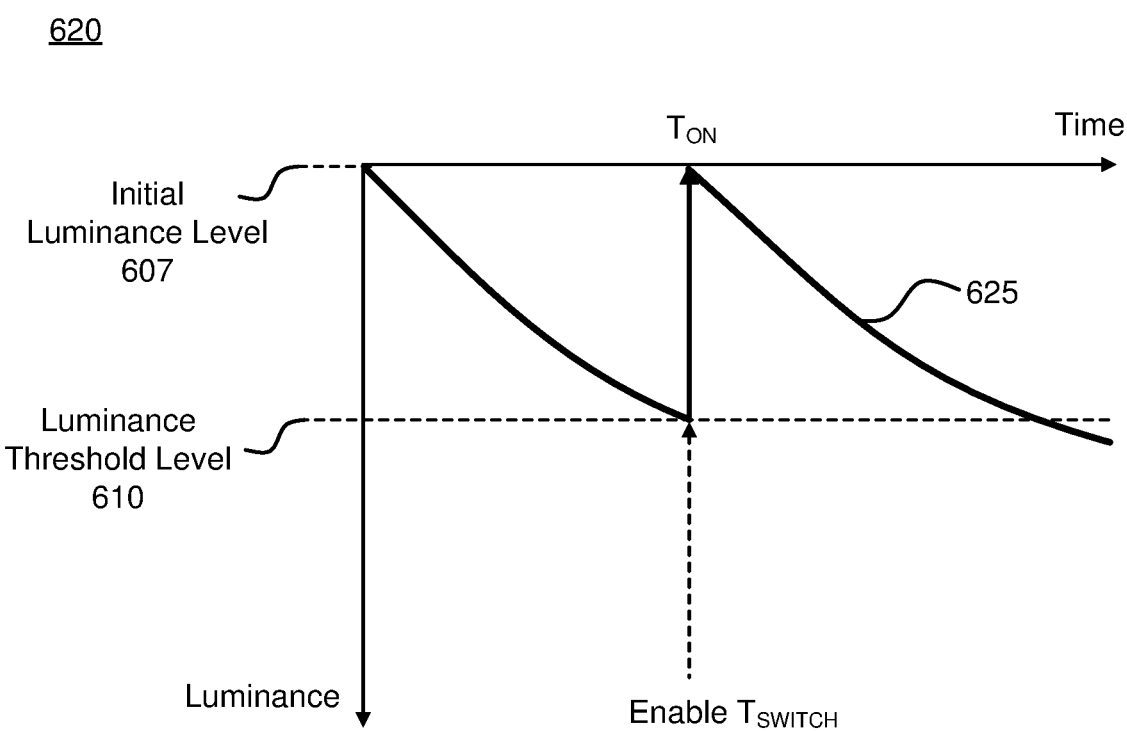
FIG. 6B is a graph of a luminance of an OLED over time with the burn-in compensation, in accordance with one or more embodiments.

FIG. 6B is an example graph 620 of a luminance of an OLED over time with the burn-in compensation implemented at a pixel circuit (e.g., the pixel circuit 310) that integrates the OLED, in accordance with one or more embodiments. A plot 625 illustrates the OLED luminance as a function of time with the burn-in compensation implemented at the pixel circuit. Until a time $T_{ON}$, the OLED operates without the burn-in compensation. At the time $T_{ON}$ when the OLED luminance reaches the luminance threshold level 610 (e.g., 95% of the initial luminance level 607), a switching transistor at the pixel circuit is turned on (i.e., enabled) by an enable signal (e.g., the enable signal 410 or one of the enable signals $515_{11}, \ldots, 515_{MN}$), which further activates a second driving transistor at the pixel circuit that almost instantaneously increases a driving current for the OLED. Due to the increased driving current at the pixel circuit, the OLED luminance almost instantaneously increases approximately to the initial luminance level 607, as shown in FIG. 6B. After the time $T_{ON}$, the burn-in compensation is activated that provides a level of luminosity for the OLED above the luminance threshold level 610 for an extended time period in comparison with FIG. 6A when no burn-in compensation is implemented.

The enable signal is generated at the time $T_{ON}$ for initiating the burn-in compensation of the OLED when an accumulated stress index (e.g., the accumulated stress index 465 in FIG. 4B or a respective accumulated stress index $570_{11}, \ldots, 570_{MN}$ in FIG. 5B) exceeds a threshold stress index value. The threshold stress index value is associated with a luminance level of the OLED and at least a subset of other OLEDs in a display (e.g., an average luminance level of the OLEDs, or a median luminance level of the OLEDs) that is decreased over time from the initial luminance level 607 to the luminance threshold level 610 (e.g., 95% of the initial luminance level 607 of the OLEDs in the display). To initiate the burn-in compensation at the time $T_{ON}$, it is required to match the threshold stress index value with a specific luminance level (i.e., the luminance threshold level 610) using, e.g., one or more premeasurement tests. In other words, it is required to determine, through the one or more premeasurement tests, which value of the accumulated stress index would correspond to the threshold stress index value that degrades the luminance level to the luminance threshold level 610 (e.g., to 95% of the initial luminance level 607).

FIG. 7 is a flowchart illustrating a process 700 of operating a pixel circuit (e.g., the pixel circuit 310) for achieving a burn-in compensation, in accordance with one or more embodiments. The process 700 shown in FIG. 7 may be performed by components of the pixel circuit (e.g., components of the pixel circuit 310). The pixel circuit may be integrated into a display comprising an array of pixel circuits, each of the pixel circuits having a same structure as the pixel circuit. Other entities may perform some or all of the steps in FIG. 7 in other embodiments. Embodiments may include different and/or additional steps, or perform the steps in different orders.

At 705, the pixel circuit provides, via a first driving transistor between a voltage source and a LED, first current $i_T$ from the voltage source to the LED according to a gate voltage of the first driving transistor. At 710, the pixel circuit turns on a switching transistor coupled to a gate electrode of the first driving transistor after receiving an enable signal. At 715, the pixel circuit provides, via a second driving transistor connected between the voltage source and the LED, second current $i_A$ from the voltage source to the LED according to a version of the gate voltage of the first driving transistor received at a gate of the second driving transistor via the switching transistor. A size of the second driving transistor may be less than a size of the first driving transistor.

An enable start-up circuit coupled to the pixel circuit generates the enable signal when an index exceeds a threshold value. The index may be based on a temperature and a luminance associated with a display that integrates the pixel circuit. The enable start-up circuit may be turned off after a pre-determined time period after the generation of the enable signal. A hold circuit may be coupled to the enable start-up circuit and the pixel circuit to preserve a voltage level of the enable signal for the pixel circuit after the enable start-up circuit is turned off.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A pixel circuit comprising:
   a light-emitting diode (LED);
   a first driving transistor between a voltage source and the LED, the first driving transistor configured to provide first current from the voltage source to the LED according to a gate voltage of the first driving transistor;
   a switching transistor coupled to a gate electrode of the first driving transistor, the switching transistor turned on after receiving an enable signal; and
   a second driving transistor connected between the voltage source and the LED, the second driving transistor configured to provide second current from the voltage source to the LED according to a version of the gate voltage of the first driving transistor received at a gate of the second driving transistor via the switching transistor.

2. The pixel circuit of claim 1, wherein a size of the second driving transistor is less than a size of the first driving transistor.

3. The pixel circuit of claim 1, wherein an enable start-up circuit is coupled to the pixel circuit to generate the enable signal when an index exceeds a threshold value, the index based on a temperature and a luminance associated with a display integrating the pixel circuit.

4. The pixel circuit of claim 3, wherein the enable start-up circuit is turned off after a pre-determined time period after the generation of the enable signal.

5. The pixel circuit of claim 4, wherein a hold circuit is coupled to the enable start-up circuit and the pixel circuit, the hold circuit configured to preserve a voltage level of the enable signal for the pixel circuit after the enable start-up circuit is turned off.

6. The pixel circuit of claim 1, wherein an enable start-up circuit is coupled to the pixel circuit, the enable start-up circuit comprises:
   a frame intensity determination circuit configured to determine a respective average gray intensity value of each image frame of a plurality of image frames;
   a first mapping circuit coupled to the frame intensity determination circuit, the first mapping circuit configured to map the respective average gray intensity value to a respective stress index for each image frame;
   a second mapping circuit configured to map a temperature value to a temperature index, the temperature value associated with a display comprising the pixel circuit;
   a multiplier circuit coupled to the first and second mapping circuits, the multiplier circuit configured to compute a respective total stress index for each image frame by multiplying the respective stress index and the temperature index;
   an accumulator circuit coupled to the multiplier circuit, the accumulator circuit configured to determine an accumulated stress index by accumulating a plurality of total stress indexes across the plurality of image frames; and
   a decision circuit coupled to the accumulator circuit, the decision circuit configured to generate the enable signal when the accumulated stress index exceeds a threshold stress index value.

7. The pixel circuit of claim 6, wherein the threshold stress index value is associated with a level of luminosity of the LED at a threshold luminosity level.

8. The pixel circuit of claim 1, wherein the pixel circuit is integrated into a display comprising an array of pixel circuits, each of the pixel circuits having a same structure as the pixel circuit.

9. The pixel circuit of claim 8, wherein multiple pixel circuits of the array share the enable signal.

10. The pixel circuit of claim 8, wherein an enable start-up circuit is coupled to the pixel circuit to generate the enable signal and at least one other enable signal for each pixel circuit from at least one subset of pixel circuits of the array.

11. The pixel circuit of claim 8, wherein the display is part of a headset.

12. The pixel circuit of claim 1, wherein the LED is an organic light emitting diode.

13. A display comprising:
an enable start-up circuit configured to generate one or more enable signals; and
an array of pixel circuits coupled to the enable start-up circuit to receive the one or more enable signals, each pixel circuit in the array comprising:
a light-emitting diode (LED),
a first driving transistor between a voltage source and the LED, the first driving transistor configured to provide first current from the voltage source to the LED according to a gate voltage of the first driving transistor,
a switching transistor coupled to a gate electrode of the first driving transistor, the switching transistor turned on after receiving an enable signal of the one or more enable signals, and
a second driving transistor connected between the voltage source and the LED, the second driving transistor configured to provide second current from the voltage source to the LED according to a version of the gate voltage of the first driving transistor received at a gate of the second driving transistor via the switching transistor.

14. The display of claim 13, wherein the enable start-up circuit is further configured to:
generate a first of the one or more enable signals for turning on a respective switching transistor in each of a first plurality of pixel circuits in the array; and
generate a second of the one or more enable signals for turning on a respective switching transistor in each of a second plurality of pixel circuits in the array.

15. The display of claim 13, wherein the enable start-up circuit generates the one or more enable signals when one or more indexes exceeds one or more threshold values, the one or more indexes based on at least one temperature and at least one luminance associated with the display.

16. The display of claim 13, wherein the enable start-up circuit comprises:
a frame intensity determination circuit configured to determine one or more respective average gray intensity values of one or more blocks of pixel elements in each image frame of a plurality of image frames;
a first mapping circuit coupled to the frame intensity determination circuit, the first mapping circuit configured to map the one or more respective average gray intensity values to one or more respective stress indexes for the one or more blocks in each image frame;
a second mapping circuit configured to map at least one temperature value to a temperature index, the at least one temperature associated with the array of pixel circuits;
one or more multiplier circuits coupled to the first and second mapping circuits, the one or more multiplier circuits configured to compute one or more respective total stress indexes for the one or more blocks in each image frame by multiplying the one or more respective stress indexes and the temperature index;
an accumulator circuit coupled to the one or more multiplier circuits, the accumulator circuit configured to determine one or more accumulated stress indexes by accumulating a respective plurality of total stress indexes across the plurality of image frames; and
a decision circuit coupled to the accumulator circuit, the decision circuit configured to generate the one or more enable signals when the one or more accumulated stress indexes exceeds one or more threshold stress index values.

17. The display of claim 16, wherein each of the one or more threshold stress index values is associated with a level of luminosity of each LED of a respective plurality of pixels circuits in the array being at a threshold luminosity level.

18. The display of claim 13, wherein the LED is an organic light emitting diode, and the display is part of a headset.

19. A method for operating a pixel circuit, the method comprising:
providing, via a first driving transistor between a voltage source and a light-emitting diode (LED), first current from the voltage source to the LED according to a gate voltage of the first driving transistor;
turning on a switching transistor coupled to a gate electrode of the first driving transistor after receiving an enable signal; and
providing, via a second driving transistor connected between the voltage source and the LED, second current from the voltage source to the LED according to a version of the gate voltage of the first driving transistor received at a gate of the second driving transistor via the switching transistor.

20. The method of claim 19, further comprising:
generating, by an enable start-up circuit coupled to the pixel circuit, the enable signal when an index exceeds a threshold value, the index based on a temperature and a luminance associated with a display integrating the pixel circuit.

* * * * *